(12) United States Patent
Spencer et al.

(10) Patent No.: US 6,450,707 B1
(45) Date of Patent: Sep. 17, 2002

(54) FILM CUTTING APPARATUS FOR REMOVING AND SEPARATING A FILM STRIP FROM A CARTRIDGE

(75) Inventors: Timothy F. Spencer, Rochester; Thomas W. Glanville, Churchville, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/887,411

(22) Filed: Jun. 22, 2001

(51) Int. Cl.[7] .............................................. G03B 17/22
(52) U.S. Cl. ........................ 396/445; 396/613; 242/527
(58) Field of Search ................................. 396/445, 613; 355/29; 242/522, 526, 527

(56) References Cited

U.S. PATENT DOCUMENTS 4,791,443 A * 12/1988 Foley et al. .................... 307/64
5,250,974 A    10/1993 Iwasaki et al.
5,826,131 A *  10/1998 Tsuji et al. .................. 396/612

* cited by examiner

Primary Examiner—David M. Gray
(74) Attorney, Agent, or Firm—Thomas H. Close

(57) ABSTRACT

Film cutting apparatus for removing and separating a film strip from a cartridge, one end of the film strip being secured to a spool within the cartridge, includes a carrier for receiving the film cartridge and moveable between a first position and a second position; a spring connected to the carrier for biasing the carrier toward the first position; a film drive for receiving a leading end of the film strip and pulling the film strip from the cartridge and then pulling the carrier away from the first position when the film strip is fully extracted from the cartridge; a sensor for sensing the movement of the carrier away from the first position and producing a signal in response thereto; and a knife mechanism mounted on the carrier for movement with the carrier and responsive to the signal for separating the film strip from the cartridge while the carrier is moving.

5 Claims, 1 Drawing Sheet

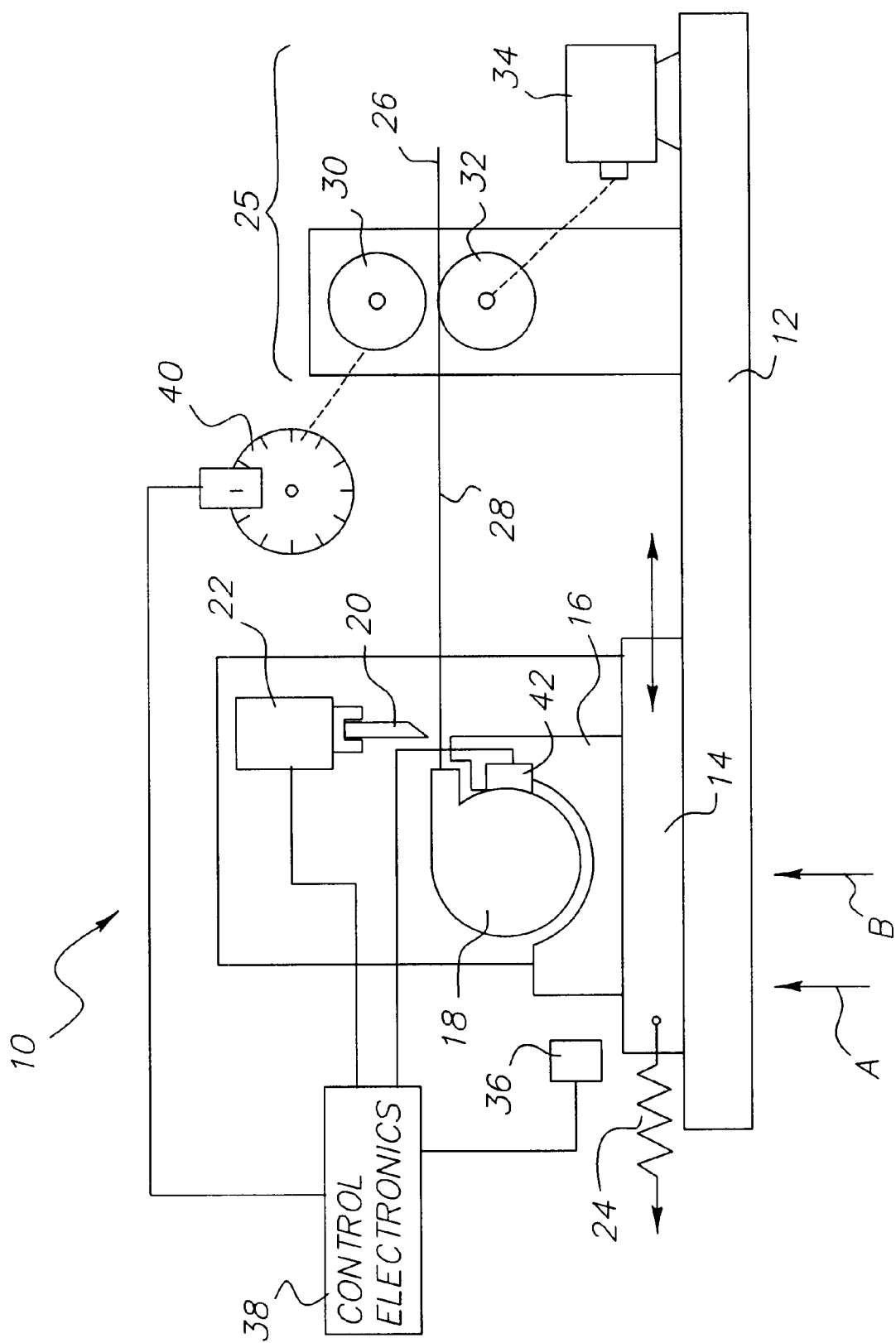

FILM CUTTING APPARATUS FOR REMOVING AND SEPARATING A FILM STRIP FROM A CARTRIDGE

FIELD OF THE INVENTION

The present invention relates to web cutting apparatus and more particularly to apparatus for removing and cutting a film strip from a cartridge.

BACKGROUND OF THE INVENTION

U.S. Pat. No. 5,250,974 issued Oct. 5, 1993 to Iwasaki et al. shows a film cutter for removing and separating a film strip from a cartridge prior to processing the film in a film processor. The film cutter includes a carrier for holding the film cartridge. The carrier is biased to a home position and is moveable toward a switch when all of the film has been removed from the cartridge. A knife is mounted on the apparatus and when the carrier moves to trip the switch, the knife is activated to cut the film loose from the cartridge. It has been discovered that during film processing, using certain types of processing, that very slight changes in the velocity of the film will cause processing artifacts, in the form of lines, to appear in the processed film. The film cutter disclosed by Iwasaki et al. has the drawback that when the knife cuts the film, slight changes in the velocity of the film are generated, thereby potentially causing processing artifacts. There is a need therefore for an improved film cutting apparatus that avoids this problem.

SUMMARY OF THE INVENTION

The need is met according to the present invention by providing a film cutting apparatus for removing and separating a film strip from a cartridge, one end of the film strip being secured to a spool within the cartridge, that includes a carrier for receiving the film cartridge and moveable between a first position and a second position; a spring connected to the carrier for biasing the carrier toward the first position; a film drive for receiving a leading end of the film strip and pulling the film strip from the cartridge and then pulling the carrier away from the first position when the film strip is fully extracted from the cartridge; a sensor for sensing the movement of the carrier away from the first position and producing a signal in response thereto; and a knife mechanism mounted on the carrier for movement with the carrier and responsive to the signal for separating the film strip from the cartridge while the carrier is moving.

ADVANTAGES

The present invention has the advantage that the cartridge and the mount for the film cutting apparatus undergo no relative motion during the cutting operation. Because the film cutting mechanism travels at the same speed as the film during the cutting operation, the film does not experience sudden stresses or velocity changes that could cause physical defects or processing artifacts.

Furthermore the film cutting apparatus of the present invention offers more flexibility in terms of cutting speed and shear angle since the cut does not impact the motion of the film and may occur over a longer period of time.

BRIEF DESCRIPTION OF THE DRAWINGS

FIG. 1. is a schematic side view of a film cutting apparatus according to the present invention.

DETAILED DESCRIPTION OF THE INVENTION

Referring to FIG. 1, a film cutting apparatus 10 according to the present invention is mounted on a base 12. A carrier 14 is mounted for sliding movement on the base 12 between a first position A and a second position B. The sliding mount may comprise for example a cross roller slide. The carrier 14 includes a nest 16 for receiving a film cartridge 18, such as a 35 mm film cartridge where a film strip is connected to a spool (not shown) in the cartridge 18 by an adhesive strip. A film cutting knife 20 driven by an actuator 22, such as an air cylinder or solenoid, is also mounted on the carrier 14. The film cutting knife 20 is located close enough to the film cartridge so that the knife does not cut into a film frame when the film is fully extended from the cartridge.

The carrier 14 is biased toward the first position A by a biasing means such as a spring 24. A film drive 25 for receiving a leading edge 26 of a film strip 28 from film cartridge 18 includes an idle roller 30 and a driven roller 32. A drive motor 34 is connected to the driven roller 32 to withdraw the film strip from the cartridge A carrier position sensor 36, such as a photoelectric sensor of the type that includes a light emitting diode shining on a photodiode interruptible by an opaque vane, is located to sense the position of carrier 14 and to generate a signal when carrier 14 moves away from the first position A. Control electronics 38 receives the signal from the carrier position sensor and controls the actuator 22 in response thereto.

In operation, when the film strip 28 is fully withdrawn from the film cartridge 18, the film drive 25 (by continuing to pull on the film strip 28) pulls the carrier 14 away from the first position A against the force of spring 24 towards the second position B. The carrier position sensor 36 senses this movement of the carrier 14 away from the first position and signals the actuator 22 to drive knife 20 to cut the film strip 28. When the film strip is cut, the force of spring 24 returns carrier 14 to the first position.

The film cutting apparatus of the present invention is particularly useful with a film processor (not shown) of the type wherein the film strip is fed into the processor from a film cartridge and film processing is commenced before the film is entirely removed from the cartridge. By moving the knife 20 on the carrier along with the film strip 28 while the knife is cutting the film strip, forces generated by the knife on the film strip are minimized, and the film does not experience any velocity changes during the cutting operation that could cause physical defects or processing artifacts in the film.

To insure that the film strip 28 is not cut due to a jam in the cartridge 18, the film cutting apparatus 10 can be provided with an encoder 40 connected to the film drive 25 for measuring the length of the film strip removed from the cartridge 18 and providing a film length signal to the control electronics 38. A film cartridge code sensor 42 reads the film code on the cartridge 18 and sends a signal to the control electronics indicating the length of the film contained in the cartridge 18. If the film length sensed by the encoder 40 does not match the length read by the film cartridge code sensor 42, when the control electronics receives the signal from sensor 36, the control electronics inhibits the actuation of the cutter until the lengths match.

Additionally, the control electronics 38 may include a time out mechanism (not shown) that will signal the actuator 22 to cut the film a predetermined time (e.g. one second) after sensor 36 signals that the carrier has moved, even if the lengths read by encoder 40 and film cartridge code sensor 42 do not match.

The invention has been described in detail with particular reference to certain preferred embodiments thereof, but it will be understood that variations and modifications can be effected within the spirit and scope of the invention.

PARTS LIST 10 film cutting apparatus
12 base
14 carrier
16 nest
18 cartridge
20 knife
22 actuator
24 spring
25 film drive
26 leading edge of film
28 film strip
30 idle roller
32 driven roller
34 drive motor
36 position sensor
38 control electronics
40 encoder
42 film cartridge code sensor

What is claimed is:

1. Film cutting apparatus for removing and separating a film strip from a cartridge, one end of the film strip being secured to a spool within the cartridge, comprising:
   a) a carrier for receiving the film cartridge and moveable between a first position and a second position;
   b) biasing means connected to the carrier for biasing the carrier toward the first position;
   c) a film drive for receiving a leading end of the film strip and pulling the film strip from the cartridge and then pulling the carrier away from the first position when the film strip is fully extracted from the cartridge;
   d) a sensor for sensing the movement of the carrier away from the first position and producing a signal in response thereto, and
   e) a knife mechanism mounted on the carrier for movement with the carrier and responsive to the signal for separating the film strip from the cartridge while the carrier is moving.

2. The film cutting apparatus claimed in claim 1, wherein the knife mechanism includes a guillotine blade and a solenoid connected to the blade.

3. The film cutting apparatus claimed in claim 1, wherein the biasing means is a spring.

4. The film cutting apparatus claimed in claim 1, further comprising:
   an encoder connected to the film drive for sensing the length of film removed from a cartridge;
   a film cartridge code sensor for sensing the length of film in the film cartridge; and
   control electronics for comparing the length of film sensed by the encoder and the length of film sensed by the film cartridge code sensor and inhibiting the knife mechanism when the sensed film lengths do not match.

5. The film cutting apparatus claimed in claim 4, further comprising:
   a time out mechanism in the control electronics for cutting the film a predetermined time after the carrier moves away from the first position even if the sensed lengths don't match.

* * * * *